United States Patent
Parod et al.

(10) Patent No.: US 10,381,970 B2
(45) Date of Patent: Aug. 13, 2019

(54) IRRIGATION MOTOR AND GEARBOX TEMPERATURE MONITORING AND CONTROL SYSTEM

(71) Applicant: LINDSAY CORPORATION, Omaha, NE (US)

(72) Inventors: Rick Parod, Omaha, NE (US); Rick Provaznik, Omaha, NE (US); Mark William Miller, Elkhorn, NE (US)

(73) Assignee: Lindsay Corporation, Omaha, NE (US)

( * ) Notice: Subject to any disclaimer, the term of this patent is extended or adjusted under 35 U.S.C. 154(b) by 71 days.

(21) Appl. No.: 15/822,941

(22) Filed: Nov. 27, 2017

(65) Prior Publication Data

US 2019/0165716 A1  May 30, 2019

(51) Int. Cl.
| | |
|---|---|
| G05D 7/00 | (2006.01) |
| H02P 29/032 | (2016.01) |
| H02P 29/66 | (2016.01) |
| A01G 25/16 | (2006.01) |
| G05B 23/02 | (2006.01) |
| A01G 25/09 | (2006.01) |

(52) U.S. Cl.
CPC ............ H02P 29/032 (2016.02); A01G 25/16 (2013.01); G05B 23/021 (2013.01); *H02P 29/662* (2016.11); *A01G 25/09* (2013.01); *G05B 2219/2625* (2013.01)

(58) Field of Classification Search
USPC ......... 700/284; 405/37–39, 54, 56; 239/695, 239/725
See application file for complete search history.

(56) References Cited

U.S. PATENT DOCUMENTS

| | | |
|---|---|---|
| 5,651,500 A | 7/1997 | Green et al. |
| 8,928,263 B2 | 1/2015 | Yamaguchi |
| 9,337,707 B2 | 5/2016 | Dixon |
| 2014/0334942 A1 | 11/2014 | Koehl |

*Primary Examiner* — Mohammad Ali
*Assistant Examiner* — Sheela Rao
(74) *Attorney, Agent, or Firm* — Hovey Williams LLP (57) ABSTRACT

A control system for monitoring a motor and wheel drive gearbox of an irrigation system drive train. The control system includes a motor sensor for sensing an operating state of the motor and a gearbox sensor for sensing an operating state of the wheel drive gearbox. If the motor operating state exceeds a motor operating state threshold or changes too quickly, or if the wheel drive gearbox operating state exceeds a wheel drive gearbox operating state threshold or changes too quickly, the control system operates the drive train at a reduced capacity or in a modified mode such that the operating state is not exceeded or does not change too quickly.

20 Claims, 3 Drawing Sheets

IRRIGATION MOTOR AND GEARBOX TEMPERATURE MONITORING AND CONTROL SYSTEM

BACKGROUND

Irrigation systems such as center pivot and linear irrigation systems have a number of drive trains each comprising a drive motor and a wheel drive gearbox. The drive motors are susceptible to overheating and overdrawing electric current. Each drive motor typically has a motor protector for opening its electrical circuit when it starts to get too hot or begins drawing too much current. This prevents further damage to the drive motor but often results in significant irrigation system down time until the drive motor is fixed or replaced.

The wheel drive gearboxes are also susceptible to overheating. Lubricants in the wheel drive gearboxes lose viscosity when their temperatures rise, resulting in deterioration of their moving parts. This further raises the temperature of the lubricants in a runaway effect, which can lead to failure of the wheel drive gearboxes. The extra resistance of an overheated wheel drive gearbox also puts extra strain on the drive motor, thus exacerbating drive motor overheating. Furthermore, overheating of a wheel drive gearbox is often not discovered until it fails, which can damage the drive motor and other components and often results in significant irrigation system down time until the wheel drive gearbox, drive motor, and other affected components are fixed or replaced.

Irrigation drive train components may also heat up too quickly or increase current draw too quickly without exceeding temperature or current draw thresholds. Since irrigation control systems typically only monitor drive motor temperatures and current draw, some drive train problems go undetected until the affected part is damaged or fails.

Irrigation drive train performance complications, such as overheating and overdrawing electric current, can be caused by a number of factors including large diameter tires, higher speed output motors, variable frequency drives, terrain, rutting (intentional or unintentional), and aging drive train components. These factors are not typically tracked, which often results in less than optimal solutions being employed during maintenance. For example, a short rut causing a drive motor to temporarily overheat may result in an unnecessary motor replacement and unnecessary irrigation system down time. A failing wheel drive gearbox may cause its drive motor to overheat, resulting in the drive motor and not the wheel drive gearbox being replaced.

SUMMARY

Embodiments of the present invention solve the above-described and other problems and limitations by providing a control system for monitoring and tracking operating states and operating state rates of change of drive trains of an irrigation system. The control system also operates the irrigation system in a reduced capacity or modified mode when the operating states or operating state rates of change exceed predetermined thresholds.

An embodiment of the invention is a control system for monitoring and controlling motors and/or wheel drive gearboxes of drive trains of an irrigation system. The control system includes a number of motor sensors, a number of wheel drive gearbox sensors, a number of motor controllers, a number of wheel drive gearbox processors, a number of fluid flow controllers, and a system controller.

The motor sensors sense operating states of the drive motors and may be temperature sensors, current sensors, voltage sensors, torque sensors, or any other suitable sensors. For example, temperature sensors may be used for sensing temperatures of the drive motors. Current sensors may be used for sensing an amount of current being delivered to or used by the drive motors.

The wheel drive gearbox sensors sense operating states of the wheel drive gearboxes and may be temperature sensors, pressure sensors, viscosity sensors, torque sensors, or any other suitable sensors. For example, temperature sensors may be used for sensing temperatures of the lubricant in the wheel drive gearboxes. Pressure sensors or viscosity sensors may be used for sensing a breakdown or viscosity of the lubricant.

The motor controllers activate the drive motors according to instructions received from the system controller. Each motor controller may include computing components such as a processor, memory, user interface, power component, and communication component for communicating with the system controller and/or remote communications equipment over a wireless network or wired network.

The wheel drive gearbox processors provide communication between the wheel drive gearbox sensors and the system controller. Each wheel drive gearbox processor may include computing components such as a controller, memory, user interface, power component, and communication component for communicating with the system controller and/or remote communications equipment over the wireless network or wired network. The wheel drive gearbox processors may be integrated with the motor controllers.

The fluid flow controllers activate valves or other controllable fluid flow components. Each fluid flow controller may include computing components such as a processor, memory, user interface, power component, and communication component for communicating with the system controller and/or remote communications equipment over the wireless network or wired network.

The system controller manages the motor controllers, wheel drive gearbox processors, and fluid flow controllers and may include computing components such as a processor, memory, power components, and communication components for communicating with the above controllers over the wireless network or wired network.

The control system monitors operating states of the drive motors and wheel drive gearboxes and controls the irrigation system in response to the operating states as follows. First, the system controller instructs the motor controllers to transmit a signal to the motor sensors to sense an operating state of the drive motors. The motor sensors modify the signal according to the drive motor operating state or generate a return signal representing the drive motor operating state.

The motor controllers then transmit data representative of the motor operating state to the system controller. The system controller then compares the motor operating state to a motor operating state threshold. The system controller may also compare a rate of change in the motor operating state with a motor operating state rate of change threshold.

If the system controller determines that the motor operating state exceeds the motor operating state threshold or that the motor operating state is changing too quickly, the system controller generates and transmits a controlling command so that the affected drive train continues operating such that the motor operating state does not exceed the motor operating state threshold or the motor operating state rate of change does not exceed the motor operating state rate of change threshold. For example, the system controller may transmit a command to the drive motor to reduce a motor speed or change a commanded motor speed. The command may be a decrease in commanded motor speed if the commanded motor speed is over 60 Hz and an increase in commanded motor speed if the commanded motor speed is lower than 60 Hz. Alternatively, the system controller may enact an operating change such as a motor on cycle time reduction or activation of a cooling mechanism. It will be understood that motor outputs of other drive motors may need to be altered to keep the irrigation system aligned.

The system controller also instructs the wheel drive gearbox processors to transmit a signal to the wheel drive gearbox sensors to sense an operating state of the wheel drive gearboxes. The wheel drive gearbox sensors modify the signal according to the wheel drive gearbox operating state or generate a return signal representing the wheel drive gearbox operating state.

The wheel drive gearbox processors transmit data representative of the wheel drive gearbox operating state to the system controller. The system controller then compares the wheel drive gearbox operating state to a wheel drive gearbox operating state threshold. The system controller may also compare a rate of change in the wheel drive gearbox operating state with a wheel drive gearbox operating state rate of change threshold.

If the system controller determines that the wheel drive gearbox operating state exceeds the wheel drive gearbox operating state threshold or that the wheel drive gearbox operating state is changing too quickly, the system controller generates and transmits a controlling command so that the affected drive train continues operating such that the wheel drive gearbox operating state does not exceed the wheel drive gearbox operating state threshold or the wheel drive gearbox operating state rate of change does not exceed the wheel drive gearbox operating state rate of change threshold. For example, the system controller may transmit a command drive motor to reduce a motor speed or change a commanded motor speed. The command may be a decrease in commanded motor speed if the commanded motor speed is over 60 Hz and an increase in commanded motor speed if the commanded motor speed is lower than 60 Hz. Alternatively, the system controller may enact an operating change such as reduced motor on cycle time or activation of a wheel drive gearbox cooling mechanism. It will be understood that motor outputs of the other drive motors may need to be altered to keep the irrigation system aligned.

The system controller may also send a signal to the fluid flow controllers instructing them to reduce fluid output to compensate for the reduced speed at which the support towers traverse the ground. For example, the fluid output may be reduced by 10% in response to a 10% reduction in motor speed or motor on cycle time.

The system controller may also transmit a notification to a remote device indicating that an operating state threshold has been exceeded or that an operating state rate of change threshold has been exceeded. An operator may then take corrective action while the irrigation system continues operating.

The system controller will continue to monitor the operating states and operating state rates of change. If an elevated operating state falls back below the threshold or an elevated operating state rate of change falls back below the operating state rate of change threshold in response to the controlling command or operating change, the system controller may restore normal operation. Alternatively, the system controller may change control to or ramp control towards an intermediate level. For example, the system controller may increase motor cycle time back to 80% on and 20% off or an intermediate level of 70% on and 30% off.

The system controller may collect operating data that is analyzed locally or remotely for identifying drive train and irrigation system performance trends. The cause or causes of performance complications may be deduced from the performance trends and corrected. For example, increased drive train temperature (whether or not it exceeds a predetermined threshold) occurring at all times may be indicative of low tire pressure causing increased drag load, a failing drive motor gearbox or stator, a failing wheel drive gearbox, or increased field rutting. Increased drive train temperature (whether or not it exceeds a threshold) that occurs at the same point in a field may indicate an increase of field rutting at that particular location. Important data trends such as the ones described above may be transmitted in a notification to the remote device so that the operator may perform maintenance to alleviate the underlying issue while the irrigation system continues operating.

The above-described control system provides many advantages. For example, the control system monitors operating states of both the drive motors and the wheel drive gearboxes of the irrigation system drive trains. The control system determines whether an operating state of the drive motors or the wheel drive gearboxes exceeds a predetermined operating state threshold or a rate of change of the operating state exceeds a predetermined operating state rate of change threshold. Importantly, when a threshold has been exceeded, the affected drive train continues to operate in a reduced capacity or modified mode, which prevents the motor protector from tripping and stopping the irrigation system. This limits irrigation system down time and reduces the risk of crop damage due to lapses in irrigation or fertilizer or chemical treatment.

The control system also transmits a notification to a remote device indicating that an operating state threshold has been exceeded or that an operating state rate of change threshold has been exceeded. This enables an operator to inspect the irrigation system and conduct maintenance on the irrigation system if necessary. Furthermore, since the operator can inspect the irrigation system while the irrigation system continues to operate, the operator can determine whether running the irrigation system at slower speeds results in the application of too much water, fertilizer, or agrichemicals.

Operating data can also be collected and analyzed for identifying drive train and irrigation system performance trends. This allows the cause or causes of performance complications to be determined and corrected. For example, increased drive train temperature (whether or not it exceeds a predetermined threshold) occurring at all times may be indicative of low tire pressure causing increased drag load, a failing drive motor gearbox or stator, a failing wheel drive gearbox, or increased field rutting. Increased drive train temperature (whether or not it exceeds a threshold) that occurs at the same point in a field may indicate an increase of field rutting at that particular location.

This summary is not intended to identify essential features of the present invention, and is not intended to be used to limit the scope of the claims. These and other aspects of the present invention are described below in greater detail.

DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
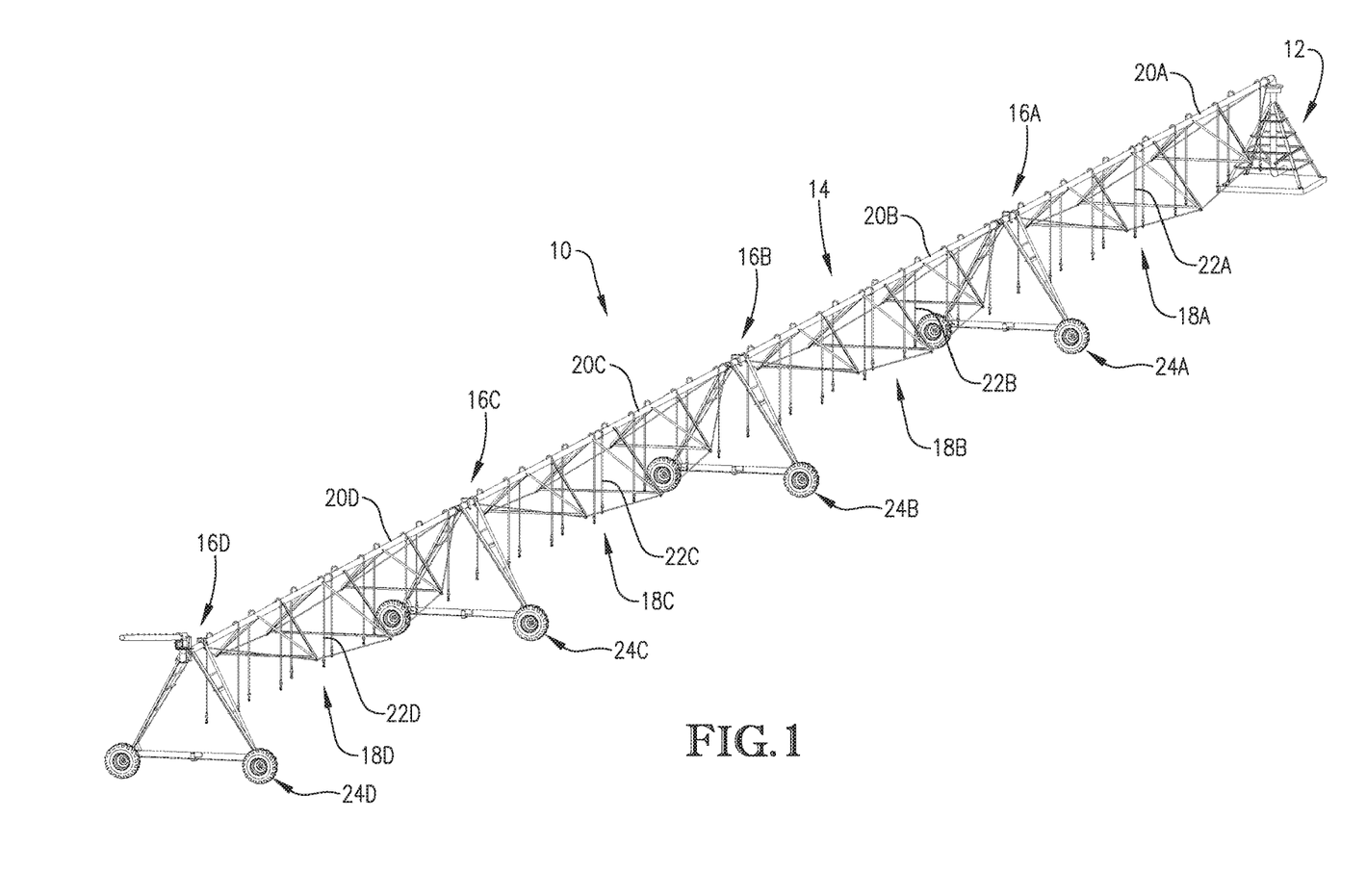
FIG. 1 is a perspective view of an exemplary fixed central pivot type irrigation system for use with an irrigation control system constructed in accordance with embodiments of the invention.

Turning to FIG. 1, an exemplary irrigation system 10 is illustrated that may be used in accordance with embodiments of the invention. The illustrated irrigation system 10 is a central pivot irrigation system broadly comprising a fixed central pivot 12 and a main section 14 pivotably connected to the central pivot 12. It will be understood that other irrigation systems such as linear irrigation systems and self-powered irrigation systems may be used without departing from the scope of the invention.

The fixed central pivot 12 may be a tower or any other support structure about which the main section 14 may pivot. The central pivot 12 has access to a well, water tank, or other source of water and may also be coupled with a tank or other source of agricultural products to inject fertilizers, pesticides and/or other chemicals into the water for application during irrigation.

The main section 14 may comprise a number of mobile support towers 16A-D. The end support tower 16D may be an extension arm (also commonly referred to as a "swing arm" or "corner arm"). The support towers 16A-D are connected to the fixed central pivot 12 and to one another by truss sections 18A-D or other supports to form a number of interconnected spans. Each of the truss sections 18A-D carries or otherwise supports a conduit section 20A-D or other fluid distribution mechanism that is connected in fluid communication with all other conduit sections. A plurality of sprinkler heads, spray guns, drop nozzles, valves, and/or other controllable fluid flow components 22A-D are spaced along the conduit sections 20A-D to apply water and/or other fluids to an area beneath the irrigation system. The irrigation system 10 includes four mobile support towers 16A-D; however, it may comprise any number of mobile support towers without departing from the scope of the present invention.

Figure 2:
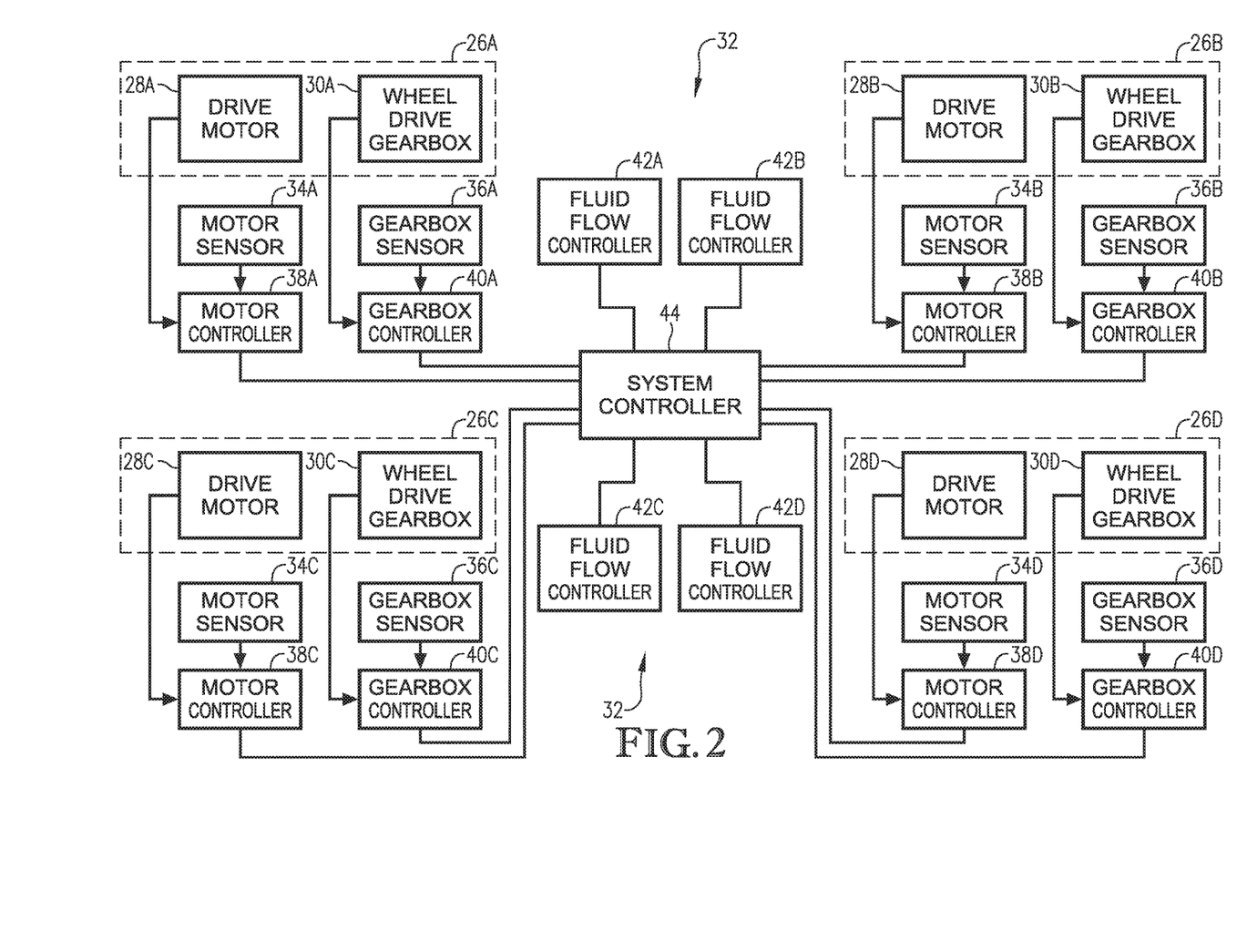
FIG. 2 is a schematic diagram of elements of an irrigation control system constructed in accordance with an embodiment of the invention.

Each mobile tower 16A-D may include a wheel assembly 24A-D and a drive train 26A-D (FIG. 2). Each wheel assembly 24A-D may include a driven wheel and a free-rotating wheel, two or more driven wheels, or a single driven wheel on which the mobile tower 16A-D is balanced. The drive train 26A-D may include a drive motor 28A-D and a wheel drive gearbox 30A-D.

The drive motor 28A-D may be a constant speed motor such as a synchronous squirrel cage induction motor configured to run at 50 Hz, 60 Hz, or any other suitable frequency. Alternatively, the drive motor 28A-D may be a variable speed motor paired with a variable frequency drive to obtain continuous motor output at varying speeds.

The wheel drive gearbox 30A-D transfers power from the drive motor 28A-D to the driven wheel(s) of the wheel assembly 24A-D at a low speed and high torque. This allows the drive motor 28A-D to propel the mobile support towers 16A-D along an irrigation path. The wheel drive gearbox 30A-D may include a viscous lubricant for smooth operation.

The irrigation system 10 includes a control system 32 for monitoring operating states of the drive trains 26A-D and controlling the drive trains 26A-D and fluid flow components 22A-D according to the operating states. The control system 32 broadly comprises a plurality of motor sensors 34A-D, a plurality of wheel drive gearbox sensors 36A-D, a plurality of motor controllers 38A-D, a plurality of wheel drive gearbox processors 40A-D, a plurality of fluid flow controllers 42A-D, and a system controller 44.

The motor sensors 34A-D sense operating states of the drive motors 28A-D and may be temperature sensors, current sensors, voltage sensors, torque sensors, or any other suitable sensors. For example, temperature sensors may be used for sensing temperatures of the drive motors 28A-D. Current sensors may be used for sensing an amount of current being delivered to or used by the drive motors 28A-D.

The wheel drive gearbox sensors 36A-D sense operating states of the wheel drive gearboxes 30A-D and may be temperature sensors, pressure sensors, viscosity sensors, torque sensors, or any other suitable sensors. For example, temperature sensors may be used for sensing temperatures of the lubricant in the wheel drive gearboxes 30A-D. Pressure sensors or viscosity sensors may be used for sensing a breakdown or viscosity of the lubricant.

The motor controllers 38A-D activate the drive motors 28A-D according to instructions received from the system controller 44 and each may include computing components such as a processor, memory, user interface, power component, and communication component for communicating with the system controller 44 and/or remote communications equipment over a wireless network or wired network. The motor controllers 38A-D may be encased in a waterproof housing or otherwise sealed from the environment to protect the motor controllers 38A-D from water, dust, and sunlight.

The wheel drive gearbox processors 40A-D provide communication between the wheel drive gearbox sensors 36A-D and the system controller 44 and each may include computing components such as a processor, memory, user interface, power component, and communication component for communicating with the system controller 44 and/or remote communications equipment over the wireless network or wired network. The wheel drive gearbox processors 40A-D may be integrated with the motor controllers 38A-D.

The fluid flow controllers 42A-D activate valves or other controllable fluid flow components and each may include computing components such as a processor, memory, user interface, power component, and communication component for communicating with the system controller 44 and/or remote communications equipment over the wireless network. The fluid flow controllers 42A-D may be encased in a waterproof housing or otherwise sealed from the environment to protect the fluid flow controllers 42A-D from water, dust, and sunlight.

The system controller 44 manages the motor controllers 38A-D, wheel drive gearbox processors 40A-D, and fluid flow controllers 42A-D and may include computing components such as a processor, memory, power components, and communication components for communicating with the motor controllers 38A-D, fluid flow components 42A-D, and/or remote communications equipment over the wireless network. The system controller 44 may run a computer programs stored in or on computer-readable medium residing on or accessible by the system controller 44. The computer programs preferably comprise ordered listings of executable instructions for implementing logical functions in the system controller 44, motor controllers 38A-D, fluid flow controllers 42A-D, and/or remote communications equipment. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium may be one or more components incorporated into the motor controllers 38A-D, fluid flow controllers 42A-D, system controller 44, and/or remote communications equipment or computing devices.

The memory of the system controller 44 may include, for example, removable and non-removable memory elements such as RAM, ROM, flash, magnetic, optical, USB memory devices, and/or other conventional memory elements. The memory may store various data associated with the control system 32, such as the computer program and code segments mentioned above, or other data for instructing the motor controllers 38A-D and fluid flow controllers 42A-D to perform the steps described herein. Further, the memory may store data retrieved from the motor controllers 38A-D, fluid flow controllers 42A-D, and remote communication device, and/or remote computing and memory devices.

Figure 3:
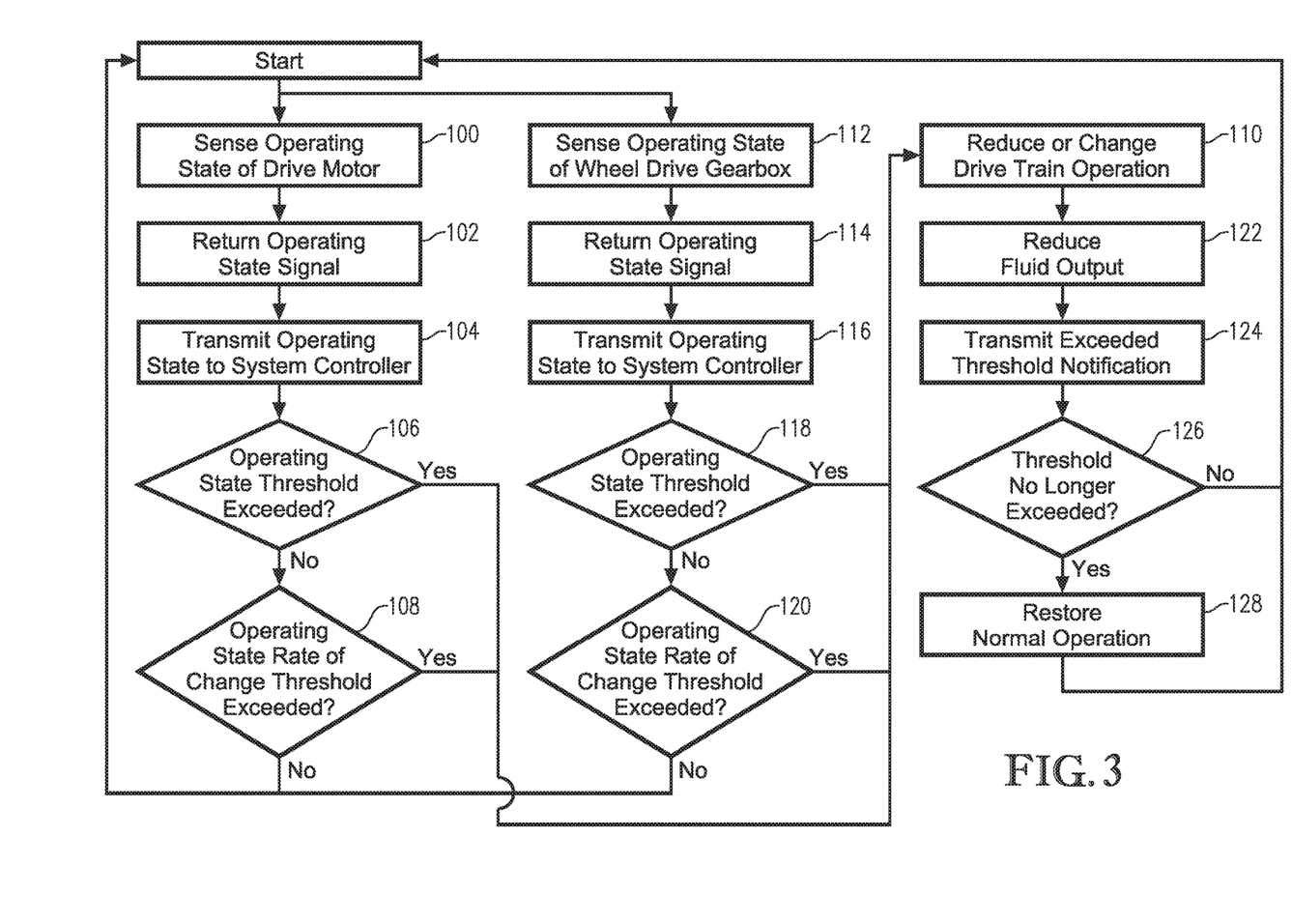
FIG. 3 is a flowchart illustrating steps involved in a method for monitoring operating states and operating state rates of change of drive trains of the irrigation system and controlling the irrigation system according to the operating states and operating state rates of change.

The control system 32 monitors operating states of the drive motors 28A-D and wheel drive gearboxes 30A-D and controls the irrigation system 10 in response to the operating states as follows. First, the system controller 44 instructs the motor controllers 38A-D to transmit a signal to the motor sensors 34A-D to sense an operating state of the drive motors 28A-D, as shown in block 100. The motor sensors 34A-D modify the signal according to the drive motor operating state or generate a return signal representing the drive motor operating state, as shown in block 102. For example, a temperature sensor on drive motor 28A may modify the transmitted signal according to a temperature of motor stator windings of drive motor 28A. As another example, a current sensor may return a signal representing a current passing through the electrical circuit of the drive motor 28A.

The motor controllers 38A-D may then transmit data representative of the motor operating state to the system controller 44, as shown in block 104. The system controller 44 may then compare the motor operating state to a motor operating state threshold, as shown in block 106. For example, if the internal temperature of drive motor 28A is higher than the maximum safe operating temperature, the system controller 44 may determine that drive motor 28A is too hot. The system controller 44 may also compare a rate of change in a motor operating state with a motor operating state rate of change threshold, as shown in block 108. For example, the system controller 44 may determine that the drive motor 28A is heating up too quickly.

If the system controller 44 determines that a motor operating state exceeds the motor operating state threshold or that the motor operating state is changing too quickly, the system controller 44 may generate and transmit a controlling command so that the affected drive train 26A-D continues operating such that the motor operating state does not exceed the motor operating state threshold or the motor operating state rate of change does not exceed the motor operating state rate of change threshold, as shown in block 110. For example, the system controller 44 may transmit a command to the drive motor 28A to reduce a motor speed or change a commanded motor speed. The command may be a decrease in commanded motor speed if the commanded motor speed is over 60 Hz and an increase in commanded motor speed if the commanded motor speed is lower than 60 Hz. Alternatively, the system controller 44 may enact an operating change such as reduced motor on cycle time. For example, the operating change may be a reduction of motor cycle time from 80% on and 20% off to 50% on and 50% off. It will be understood that motor outputs of other drive motors 28B-D may need to be altered to keep the irrigation system 10 aligned. As another alternative, the system controller 44 may activate a motor cooling mechanism. The motor cooling mechanism may employ water, air, oil, or other means of heat extraction to cool one of the drive motors 28A-D.

The system controller 44 also instructs the wheel drive gearbox processors 40A-D to transmit a signal to the wheel drive gearbox sensors 36A-D to sense an operating state of the wheel drive gearboxes 30A-D, as shown in block 112. The wheel drive gearbox sensors 36A-D modify the signal according to the wheel drive gearbox operating state or generate a return signal representing the wheel drive gearbox operating state, as shown in block 114. For example, a temperature sensor in one of the wheel drive gearbox sensors 36A-D may generate a signal representing a lubricant temperature.

The wheel drive gearbox processors 40A-D may transmit data representative of a wheel drive gearbox operating state to the system controller 44, as shown in block 116. The system controller 44 may then compare the wheel drive gearbox operating state to a wheel drive gearbox operating state threshold, as shown in block 118. For example, if the internal temperature of wheel drive gearbox 30A is higher than the maximum safe operating temperature, the system controller 44 may determine that wheel drive gearbox 30A is too hot. The system controller 44 may also compare a rate of change in the wheel drive gearbox operating state with a wheel drive gearbox operating state rate of change threshold, as shown in block 120. For example, the system controller 44 may determine that the wheel drive gearbox 30A is heating up too quickly.

If the system controller 44 determines that the wheel drive gearbox operating state exceeds the wheel drive gearbox operating state threshold or that the wheel drive gearbox operating state is changing too quickly, the system controller 44 may generate and transmit a controlling command so that the affected drive train 26A-D continues operating such that the wheel drive gearbox operating state does not exceed the wheel drive gearbox operating state threshold or the wheel drive gearbox operating state rate of change does not exceed the wheel drive gearbox operating state rate of change threshold, as shown in block 110. For example, the system controller 44 may transmit a command drive motor 28A to reduce a motor speed or change a commanded motor speed. The command may be a decrease in commanded motor speed if the commanded motor speed is over 60 Hz and an increase in commanded motor speed if the commanded motor speed is lower than 60 Hz. Alternatively, the system controller 44 may enact an operating change such as reduced motor on cycle time. For example, the operating change may be a reduction of motor cycle time from 80% on and 20% off to 50% on and 50% off. It will be understood that motor outputs of the other drive motors 28B-D may need to be altered to keep the irrigation system 10 aligned. As another alternative, the system controller 44 may activate a wheel drive gearbox cooling mechanism. The wheel drive gearbox cooling mechanism may employ water, air, oil, or other means of heat extraction to cool one of the wheel drive gearboxes 30A-D.

The system controller 44 may also send a signal to the fluid flow controllers 42A-D instructing them to reduce fluid output to compensate for the reduced speed at which the support towers 16 traverse the ground, as shown in block 122. For example, the fluid output may be reduced by 10% in response to a 10% reduction in motor speed or motor on cycle time.

The system controller 44 may also transmit a notification to a remote device indicating that an operating state threshold has been exceeded or that an operating state rate of change threshold has been exceeded, as shown in block 124. An operator may then take corrective action while the irrigation system 10 continues operating.

The system controller 44 may continue to monitor operating states and operating state rates of change, as shown in block 126. If an elevated operating state falls back below the threshold or an elevated operating state rate of change falls back below the operating state rate of change threshold in response to the controlling command or operating change, the system controller 44 may restore normal operation, as shown in block 128. Alternatively, the system controller 44 may ramp control towards an intermediate level. For example, the system controller 44 may increase motor cycle time back to 80% on and 20% off or an intermediate level of 70% on and 30% off.

The system controller 44 may collect operating data that is analyzed locally or remotely for identifying drive train and irrigation system performance trends. The cause or causes of performance complications may be deduced from these trends. For example, increased drive train temperature (whether or not it exceeds a predetermined threshold) occurring at all times may be indicative of low tire pressure causing increased drag load, a failing drive motor gearbox or stator, a failing wheel drive gearbox 30, or increased field rutting. Increased drive train temperature (whether or not it exceeds a threshold) that occurs at the same point in a field may indicate an increase of field rutting at that particular location. Important data trends such as the ones described above may be transmitted in a notification to the remote device so that the operator may perform maintenance to alleviate the underlying issue while the irrigation system 10 continues operating.

The above-described control system 32 and method provide many advantages. For example, the control system 32 monitors operating states of both the drive motors 28A-D and the wheel drive gearboxes 30A-D of the irrigation system drive trains 26A-D. The control system 32 determines whether an operating state of the drive motors 28A-D or the wheel drive gearboxes 30A-D exceeds a predetermined operating state threshold or a rate of change of the operating state exceeds a predetermined operating state rate of change threshold. Importantly, when a threshold has been exceeded, the affected drive train 26A-D continues to operate in a reduced capacity or modified mode, which prevents the motor protector from tripping and stopping the irrigation system 10. This limits irrigation system down time and reduces the risk of crop damage due to lapses in irrigation or fertilizer or chemical treatment.

The control system 32 may also transmit a notification to a remote device indicating that an operating state threshold has been exceeded or that an operating state rate of change threshold has been exceeded. This enables an operator to inspect the irrigation system 10 and conduct maintenance on the irrigation system 10 if necessary. Furthermore, since the operator can inspect the irrigation system 10 while the irrigation system 10 continues to operate, the operator can determine whether running the irrigation system 10 at slower speeds results in the application of too much water, fertilizer, or agrichemicals.

Collecting and analyzing operating data for identifying drive train and irrigation system performance trends allows for the cause or causes of drive train and irrigation system performance complications to be determined and ameliorated. For example, increased drive train temperature (whether or not it exceeds a predetermined threshold) occurring at all times may be indicative of low tire pressure causing increased drag load, a failing drive motor gearbox or stator, a failing wheel drive gearbox, or increased field rutting. Increased drive train temperature (whether or not it exceeds a threshold) that occurs at the same point in a field may indicate an increase of field rutting at that particular location.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A control system for monitoring a motor and wheel drive gearbox of an irrigation system drive train, the control system comprising:
    a motor sensor for sensing an operating state of the motor;
    a gearbox sensor for sensing an operating state of the wheel drive gearbox; and
    a controller configured to:
        receive data from the motor sensor representing the motor operating state;
        receive data from the gearbox sensor representing the gearbox operating state;
        determine whether the motor operating state exceeds a motor operating state threshold or indicates a rate of change above a motor operating state rate of change threshold;
        if the motor operating state exceeds the motor operating state threshold or indicates a rate of change above the motor operating state rate of change threshold, generate and transmit a command and/or enact an operating change so that the drive train continues to operate such that the motor operating state does not exceed the motor operating state threshold or indicates that the motor operating state rate of change does not exceed the motor operating state rate of change threshold;
        determine whether the gearbox operating state exceeds a gearbox operating state threshold or indicates a rate of change above a gearbox operating state rate of change threshold; and
        if the gearbox operating state exceeds the gearbox operating state threshold or indicates a rate of change above the gearbox operating state rate of change threshold, generate and transmit a command and/or enact an operating change so that the drive train continues to operate such that the gearbox operating state does not exceed the gearbox operating state threshold or indicates that the gearbox operating state rate of change does not exceed the gearbox operating state rate of change threshold.

2. The control system of claim 1, wherein the motor operating state is a stator winding temperature.

3. The control system of claim 1, wherein the motor operating state is an amount of electric current being delivered to the motor.

4. The control system of claim 1, wherein the gearbox operating state is a gearbox temperature.

5. The control system of claim 1, wherein the operating change is a change in commanded motor speed.

6. The control system of claim 5, wherein the change in commanded motor speed is a decrease in commanded motor speed if the commanded motor speed is over 60 Hz.

7. The control system of claim 5, wherein the change in commanded motor speed is an increase in commanded motor speed if the commanded motor speed is lower than 60 Hz.

8. The control system of claim 1, wherein the operating change is a decrease in an on cycle time of the motor.

9. The control system of claim 1, wherein the command is an activation of a motor cooling mechanism or a wheel drive gearbox cooling mechanism.

10. The control system of claim 1, wherein the controller is further configured to transmit a notification to a remote device indicating that an operating state threshold or an operating state rate of change threshold has been exceeded.

11. A method of monitoring a motor and wheel drive gearbox of an irrigation system drive train, the method comprising the steps of:
    receiving data from a motor sensor representing an operating state of the motor;
    receiving data from the gearbox sensor representing an operating state of the wheel drive gearbox;
    determining whether the motor operating state exceeds a motor operating state threshold or indicates a rate of change above a motor operating state rate of change threshold;
    if the motor operating state exceeds the motor operating state threshold or indicates a rate of change above the motor operating state rate of change threshold, generating and transmitting a command and/or enacting an operating change so that the irrigation system drive train continues operating such that the motor operating state does not exceed the motor operating state threshold or indicates that the motor operating state rate of change does not exceed the motor operating state rate of change threshold;
    determining whether the gearbox operating state exceeds a gearbox operating state threshold or indicates a rate of change above a gearbox operating state rate of change threshold; and
    if the gearbox operating state exceeds the gearbox operating state threshold or indicates a rate of change above the gearbox operating state rate of change threshold, generating and transmitting a command and/or enacting an operating change so that the irrigation system drive train continues to operate such that the gearbox operating state does not exceed the gearbox operating state threshold or indicates that the gearbox operating state rate of change does not exceed the gearbox operating state rate of change threshold.

12. The method of claim 11, wherein the motor operating state is a stator winding temperature.

13. The method system of claim 11, wherein the motor operating state is an amount of electric current being delivered to the motor.

14. The method of claim 11, wherein the gearbox operating state is a gearbox temperature.

15. The method of claim 11, wherein the operating change is a change in commanded motor speed.

16. The method of claim 15, wherein the change in commanded motor speed is a decrease in commanded motor speed if the commanded motor speed is over 60 Hz.

17. The method of claim 15, wherein the change in commanded motor speed is an increase in commanded motor speed if the commanded motor speed is lower than 60 Hz.

18. The method of claim 11, wherein the operating change is a decrease in an on cycle time of the motor.

19. The method of claim 11, wherein the command is an activation of a motor cooling mechanism or a wheel drive gearbox cooling mechanism.

20. A control system for monitoring a motor or a wheel drive gearbox of an irrigation system drive train, the control system comprising:
    a controller; and
    at least one of:
        a motor sensor for sensing an operating state of the motor; and
        a gearbox sensor for sensing an operating state of the wheel drive gearbox, the controller being configured to:

receive data from the motor sensor representing the motor operating state or from the gearbox sensor representing the gearbox operating state;

if the data is received from the motor sensor:
  determine whether the motor operating state exceeds a motor operating state threshold or indicates a rate of change above a motor operating state rate of change threshold; and
  if the motor operating state exceeds the motor operating state threshold or indicates a rate of change above the motor operating state rate of change threshold, generate and transmit a command and/or enact an operating change so that the drive train continues to operate such that the motor operating state does not exceed the motor operating state threshold or indicates that the motor operating state rate of change does not exceed the motor operating state rate of change threshold; and if the data is received from the gearbox sensor:
  determine whether the gearbox operating state exceeds a gearbox operating state threshold or indicates a rate of change above a gearbox operating state rate of change threshold; and
  if the gearbox operating state exceeds the gearbox operating state threshold or indicates a rate of change above the gearbox operating state rate of change threshold, generate and transmit a command and/or enact an operating change so that the drive train continues to operate such that the gearbox operating state does not exceed the gearbox operating state threshold or indicates that the gearbox operating state rate of change does not exceed the gearbox operating state rate of change threshold.

* * * * *